Jan. 16, 1934.   A. J. ACKERMAN   1,944,054
CABLEWAY TOWER
Filed April 10, 1933   2 Sheets-Sheet 1

INVENTOR
Adolph J. Ackerman
By Green & McCallister
His Attorneys

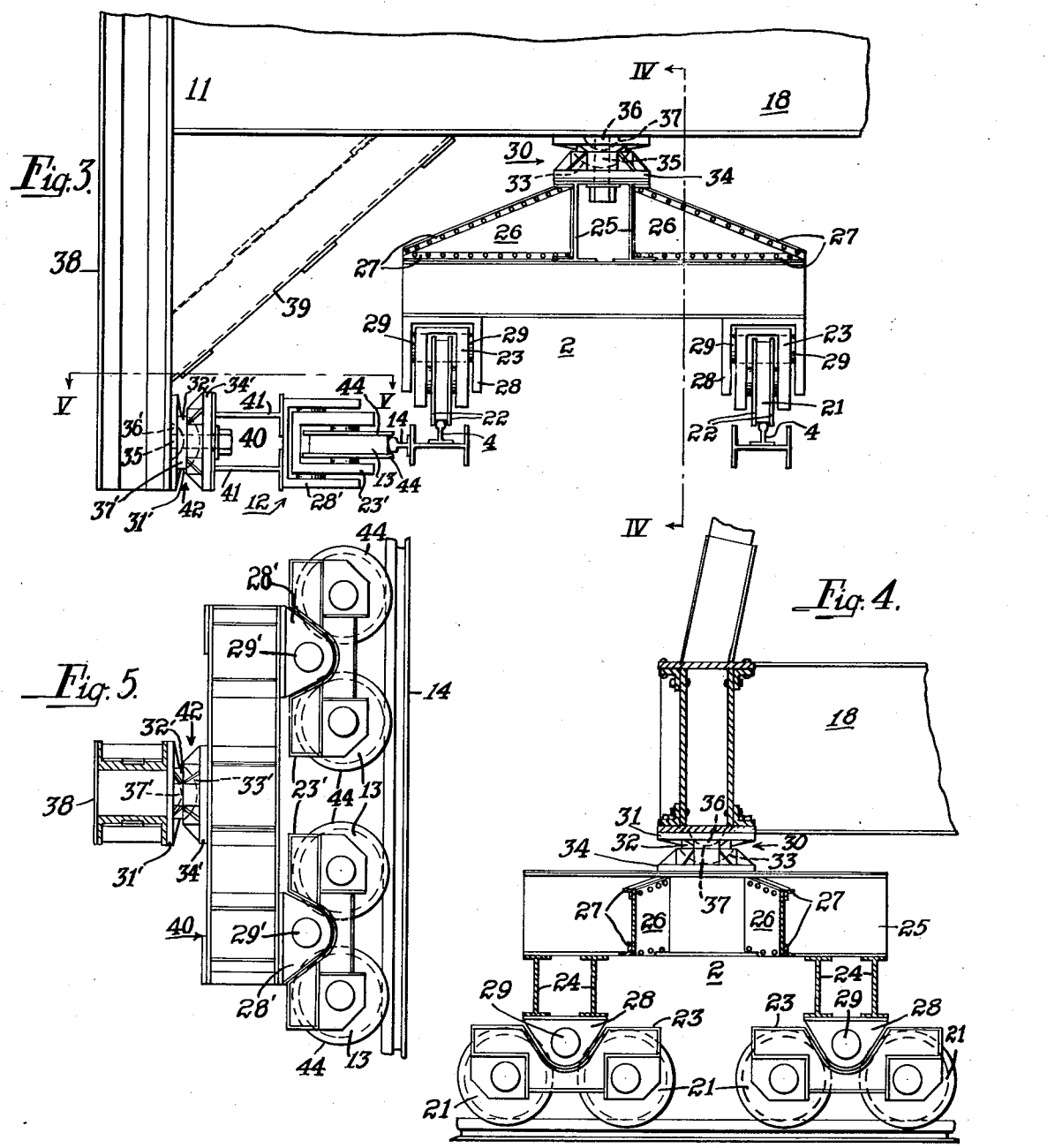

Patented Jan. 16, 1934

1,944,054

UNITED STATES PATENT OFFICE 1,944,054

CABLEWAY TOWER

Adolph J. Ackerman, Madden Dam, Canal Zone

Application April 10, 1933. Serial No. 665,260

13 Claims. (Cl. 104—247)

This invention relates to cableways and more particularly to cableway towers, the construction of the transporting trucks thereof and to apparatus for relieving the wheels of said trucks of substantially all strains incident to the horizontal thrust or horizontal component of the loads on the cables suspended between and carried by the cableway towers.

Cableways are generally used in the construction of dams and other projects where materials must be delivered into deep wide gullys or valleys and other means of transportation are either wholly inadequate or too expensive to be economically practicable.

In general, a cableway comprises two portable towers located one on each side of the gully or valley across which cables, carried by the tower, extend. Carriages provided with hoist lines run on these cables and transport buckets and various other types of material-handling equipment, such equipment being suspended from the hoist lines.

When the cableways must serve a relatively large area the towers are mounted on trucks having wheels adapted to run on rails or runways. In the prior art, it has been the practice to so design such cableways that both the weight of the towers and the vertical and horizontal components of the load on the cables would be taken by the truck wheels. The horizontal or thrust component of the cable load combined with the vertical load on the truck wheels caused frequent breakage or failure of one or more wheels.

These failures were brought about largely because of unequal distribution of the load on the truck wheels and the enormous side thrust thereon. The side thrust also tended to tip the towers and, for this reason, such towers were designed with the center of gravity as close to the tracks or runways as possible, thereby curtailing to a great extent, the height to which the towers could be built. Also, because of the low center of gravity, the clearances between the base of the towers and the rails or runways were usually so small that it was difficult for workmen to have access to the trucks for inspection, repairs and lubrication.

Other disadvantages of such prior art cableways were manifest when the tracks or runways were laid on a fill or embankment. These embankments often gave way and failed because the horizontal thrust imposed principally on the front truck wheels, was transmitted too close to the edge thereof.

An object of this invention is the provision of a portable cableway tower having means for equalizing the load on the truck wheels and to relieve such wheels of substantially all strains incident to the horizontal thrust developed by the load on the cables between the towers.

Another object of the invention is the provision of a portable cableway tower having means independent of the truck wheels for resisting the horizontal thrust and to counteract the turning moment of such thrust.

In prior art cableways the maximum length of span and their capacity to carry heavy loads were limited by the point at which wheel failure occurred. A further object of the invention is the provision of a portable cableway tower with an improved arrangement of wheels to permit the construction of such towers to support longer cableway spans or cableways of greater load carrying capacity or a combination of greater span and capacity than has been the general practice heretofore.

A further object of the invention is the provision of a portable cableway tower that may be built to relatively great heights and still have ample clearance between the base of the tower and the tracks or runways to permit easy access to the trucks and running gear for inspection, repairs, or lubrication thereof.

Other objects of the invention will, in part, be apparent and will, in part, be obvious from the following description taken in conjunction with the accompanying drawings, in which:

Fig. 3 is an enlarged fragmentary view of a corner of the tower on the rear side thereof showing more or less in detail the form and construction of the transporting trucks and the horizontal thrust trucks;

Fig. 4 is a view in section taken on line IV—IV of Fig. 3 showing a more or less detailed view of the construction of the transporting trucks; and Fig. 5 is a view in section taken on line V—V of Fig. 3 giving a plan view of one of the thrust trucks.

Throughout the drawings and the specification, like reference characters indicate like parts.

Figure 1:
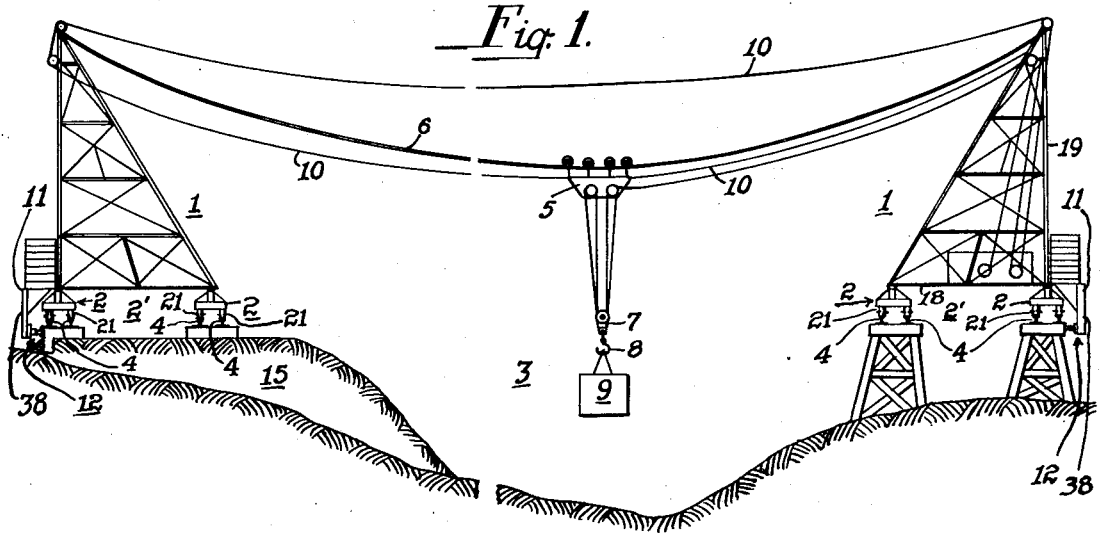
Figure 1 is a more or less diagrammatic view of a cableway shown in operative relation to a gully or valley, illustrating portable towers arranged and constructed in accordance with one form of the invention.

In Fig. 1 of the drawings, a cableway is shown comprising portable towers 1 of like construction mounted on trucks 2 for transportation on tracks or runways 2' located on opposite sides of a valley, gully, or cut 3.

The runways 2' each comprise two pairs of parallel rails 4, one pair of rails supporting the front side of the tower, that is the side adjacent gully 3 and the other pair supporting the rear side of the tower.

Construction materials may be delivered to any desired point in the gully or cut, between the towers, by means of a carriage 5 which runs on a cable 6 stretched between the tops of towers 1. The carriage is provided with hoist cables or lines having a block 7 and a hook 8 from which any load or material-handling device 9 may be suspended. Draw lines 10 are illustrated as a means of propelling carriage 5 and its suspended load across the gully to any desired point.

The draw lines 10 and the hoist cables may be operated in any suitable manner under power as is common in this art.

By moving the towers on the tracks or runways above mentioned, material may be delivered to extensive areas.

The portable towers illustrated, when in operation, are subjected to severe side thrusts caused by the horizontal component of the load on cable 6. In the prior art, the wheels of the transporting trucks of the towers were required to absorb this thrust in addition to carrying the load of the tower and the vertical component of the load on cable 6. The result was that the wheels were subjected to severe bending strains causing them to fail. In accordance with this invention, the wheels of the transporting trucks are relieved of the horizontal thrust so that they are required to carry only the load or weight of the tower and the vertical component of the load on cable 6.

This may be accomplished by forming a cantilever extension 11 on the rear side of the tower platform, and mounting thrust trucks 12 thereon having wheels 13 that run on a horizontal rail 14. These thrust trucks transmit the horizontal thrust or component of the cableway load into the bed on which the runway rails are laid and at a considerable distance from the rails on which the trucks at the front side of the tower run. This feature is of particular importance in cases where the runway rails are laid on a filled ground such as indicated at 15 in Figure 1, in that the danger of causing a slide and failure of the front part of the fill is practically nil.

A further advantage of this arrangement of wheels occurs where it is required that the runways be built of structural framework such as a trestle. In this case the horizontal wheels clearly define the point of application of the horizontal thrust so that the trestle may be readily designed in the most economical manner. Under the prior art arrangement all rails were subjected to varying amounts of horizontal thrust, a condition which made the design of an adequate trestle difficult and more expensive.

The cantilever extension overhangs the transporting trucks 2 located under the rear side of the tower platform and forms a platform on which counterweights and other apparatus conveniently may be placed to serve a useful purpose.

The horizontal thrust taken by the thrust rail 14 sets up a turning moment about the points forming the connections between the trucks at the rear side of the tower, and the tower platform, but this moment may be counterbalanced by placing weights 17 on the cantilever extension 11. These counterweights also resist the tendency of the tower to tip about the front side thereof.

By utilizing these thrust trucks 12, the tower platform may be built higher from the rail bed and the mast may be carried to greater heights without danger of the tower tipping, than would be possible in towers of prior art construction. Since the platform may be higher from the rail bed, the trucks and the underside of the tower platform are easily accessible for inspection and repairs.

The transporting trucks 2 are so constructed and the connections between the platform and the trucks are such, that the vertical load on the wheels of the trucks is substantially equally distributed between them even though the track rails may be out of level with each other and the tower may sway or tip a substantial amount. These features of construction of the trucks will be apparent from the detailed description thereof as set forth in subsequent sections hereof.

The cableway towers illustrated being similar in construction, a description of one of them will be sufficient.

Tower 1 comprises a platform or base 18 from which a mast 19, of the type known to the art as an A-mast, rises, the mast being fabricated from structural steel members of various shape and form or other materials. The platform is mounted on the trucks 2 which are located under the respective corners thereof. Each truck is illustrated as having eight wheels 21, each wheel being provided with flanges 22 that straddle the rails 4 of the runways. Wheels 21 may be grouped in pairs with two pairs on each side of the truck. The two pairs of wheels on the respective sides of the truck running on a rail 4.

The wheels of each pair are journaled in side frames 23 of substantially inverted U-shape, the frames straddling the wheels as shown in Fig. 3.

The main frame of each truck comprises cross beams 24 arranged in pairs at the ends of the trucks. These beams extend from one side frame 23 to the one directly opposite. The truck frames include, also, longitudinal beams 25 that extend across the middle of the cross beams 24. Beams 24 and 25 may be braced and tied together by means of plates 26 that extend from about the middle of beams 25 to the ends of crossbeams 24. These plates may be reenforced and stiffened by riveting or welding angles 27 to the top and bottom edges thereof.

In order that the side frames 23 may be tied to the main truck frame and at the same time permit the side frames to move relative to the truck frame proper and thereby compensate for irregularities in the track rails and insure uniform loading on the truck wheels, saddles 28 may be provided. These saddles are secured to the ends of the pairs of cross beams 24 and connected by means of pins or trunnions 29 to the middle of the respective side frames. Thus each side frame may pivot or turn on its pin or trunnion in the plane of the wheels as required by the condition of the track rails.

In order that the load on the pairs of wheels on each side of the trucks may be equalized regardless of irregularities or unevenness in the rails or of swaying of the tower, each truck frame is flexibly connected to the platform 18. This connection may be in the form of a swivel, ball and socket, or universal joint 30. Such a joint may comprise a plate 31, secured to the underside of the platform at each corner thereof, having a depending portion 32 formed with a spheroidal surface 33, and a plate 34 secured to the middle of the truck-frame beams 25. Each plate 34 has a spheroidal concavity to receive the portion 32 of bearing plate 31 directly above the same. The bearing plates of these joints may be secured to the frame and the trucks in any suitable manner and the joint may be tied together with through bolts 35. These bolts may be provided with spheroidal heads 36 which nest in concavities 37 formed in the top face of the respective bearing plates 31, thereby permitting movement of joints 30 in the manner and for the purpose intended.

By constructing the transporting trucks in this fashion, the swivel bearings 30 will equalize the distribution of the load between the side frames 23 of each truck, and since the side frames are pivoted to the truck frames, the load on the several truck wheels will be equalized also.

While the transporting trucks have been illustrated as having eight wheels, it will be understood that trucks may be designed having more or less than this number.

The thrust trucks 12 may be disposed to operate at an angle to the vertical so as to effectually resist the horizontal or thrust component resulting from the load on the cableway. As illustrated these thrust trucks are secured in horizontal position to depending supports or legs 38 attached to the outer end of the cantilever extensions 11, braces 39 being provided to give sufficient rigidity to the legs. Each truck 12 comprises a bolster 40 fabricated from I-beams 41, the bolster being secured to its support 38 by means of swivel bearings 42 of substantially the same construction as bearings or joints 30, hence similar parts have been designated by similar reference characters primed.

The opposite ends of the bolsters are provided with saddles 28' that straddle side frames 23' in which two wheels 13 are journaled. The saddles are pivotally connected to the side frames by means of pins or trunnions 29'.

Wheels 13 are provided with top and bottom flanges 44 that straddle rail 14 thus insuring positive engagement between the wheels and the rails. The top flange 44 of these wheels and the bearings 42 provide two-point suspension for trucks 12.

The swivel bearings 42 and the pin connections between the bolsters and the side frames 23' serve to equalize the load on wheels 13 even though rail 14 may be irregular or uneven, or the tower sways or tilts.

Figure 2:
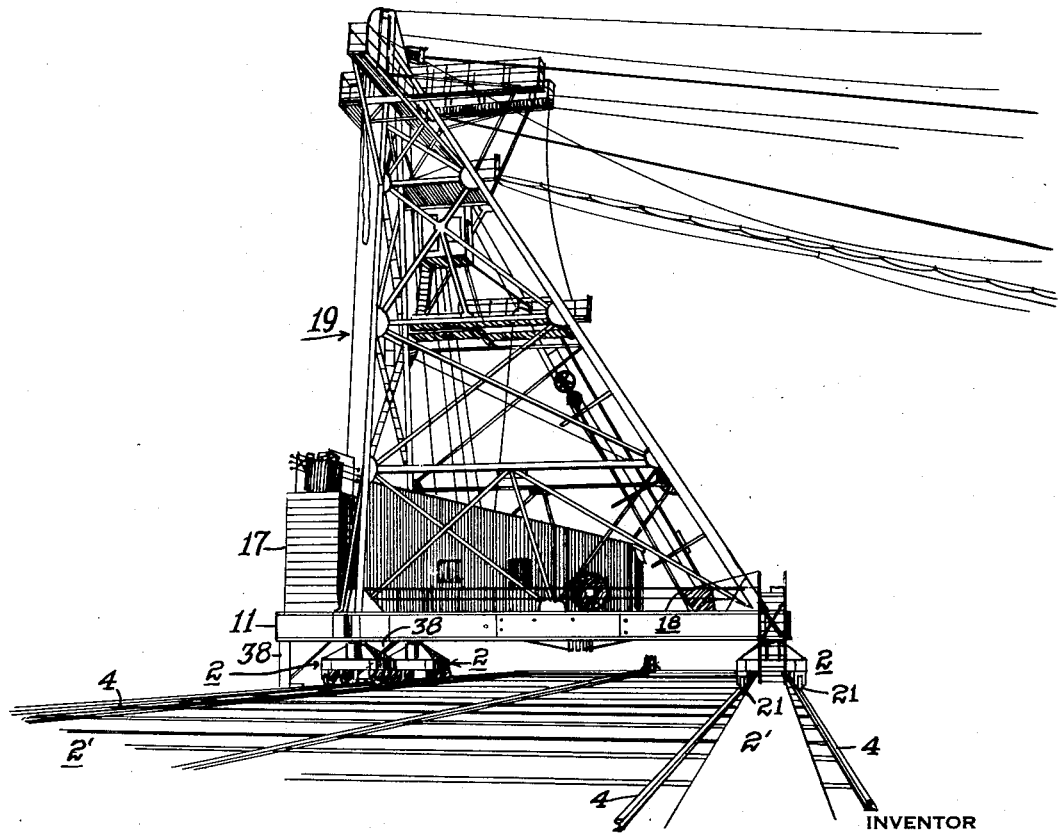
Fig. 2 is an enlarged view in perspective of a cableway tower, such as shown in Fig. 1.

As may be seen by inspection of Figs 1, 2 and 3, the thrust rail 14 may be located below runway rails 4 so that the thrust transmitted thereto will be delivered into a solid bed on which rails 4 are laid. The portion of the bed which absorbs this thrust may be at a substantial distance from the front side of the tower so that in case the transporting rails are laid on filled ground, there will be practically no danger of a slide or failure of such fill.

From the description of the invention it will thus be apparent that the cableway tower is provided with essentially two systems of load supporting wheels, in which the wheels of one system revolve in vertical planes and carry the vertical load of the tower structure as well as the vertical component of the load on the cableway, and in which the wheels of the other system revolve in planes at an angle to the vertical so as to resist the thrust component of the cableway load which component more or less acts crosswise of the line of travel of the cableway.

Having illustrated and described one form of the invention, it will be apparent to those skilled in this art that various modifications and changes may be made without departing either from the spirit or the scope of the invention. It is desired therefore that only such limitations shall be placed on the invention as are imposed thereon by the prior art and the appended claims.

What I claim as new and desire to secure by Letters Patent is:

1. In combination with a cableway tower having a platform mounted on trucks adapted to run on rails, and a mast rising from the platform, there being universal joints between the platform and trucks to allow the trucks to move relative to the platform to compensate for irregularities in the rails, of a substantially horizontal rail extending parallel to the platform truck rails, and a truck depending from the platform and having substantially horizontally disposed wheels running on said rail adapted to transmit to the horizontal rail the thrust imposed on the cableway and acting crosswise of the platform truck rails.

2. In combination with a cableway tower having a platform mounted on trucks having wheels adapted to run on rails, and a mast rising from the platform, there being universal joints between the platform and trucks to allow the trucks to move relative to the platform to compensate for irregularities in the rails and thereby equalize the load on the wheels, of a substantially horizontal rail extending parallel to the platform truck rails, and a truck depending from the platform having substantially horizontally disposed wheels running on said rail adapted to transmit to said horizontal rail the horizontal thrust imposed upon the cableway and acting crosswise of the platform truck rails, and means to counteract the turning moment of the horizontal thrust to resist tipping of the cableway.

3. In combination a cableway tower comprising a platform and mast mounted for transportation on trucks having wheels adapted to run on rails, of a cantilever on the rear side of the platform having supports depending therefrom, thrust trucks carried by said supports, and substantially horizontally disposed wheels journalled on said trucks adapted to run on a thrust rail, said cantilever and horizontal trucks transmitting to the thrust rail the horizontal thrust imposed on the cableway tower and acting in a direction lateral to the line of travel thereof.

4. In combination with a cableway comprising a platform and mast mounted for transportation on trucks provided with wheels adapted to run on rails, of a cantilever on the rear side of the platform having supports depending therefrom, thrust trucks carried by said supports, substantially horizontally disposed wheels on said trucks adapted to run on a thrust rail located in substantially the same plane as the transportation rails, said cantilever and horizontal trucks transmitting to the thrust rail the horizontal thrust imposed on the cableway and acting laterally to the transportation truck rails, and counterweights on the cantilever for counteracting the turning moment set up by the said horizontal thrust.

5. In combination with a cableway comprising a platform and mast mounted for transportation on trucks provided with wheels adapted to run on rails, of a cantilever on the rear side of the platform having supports depending therefrom, thrust trucks carried by said supports, said trucks being provided with substantially horizontally disposed wheels adapted to run on a thrust rail, and a universal joint between the thrust trucks and said supports.

6. A cableway tower having transportation trucks for carrying the vertical load of the cableway, and horizontally disposed wheels adapted to engage a thrust rail and take the horizontal thrust imposed by a cableway on the tower, and acting laterally of the line of travel of the tower.

7. A cableway tower having transportation trucks for carrying the vertical load of the cableway, and horizontally disposed wheels adapted to engage a thrust rail and take the horizontal thrust imposed by a cableway on the tower and acting laterally of the line of travel of the tower, and counterweights acting on the rear side of the cableway for counteracting the turning moment developed by said horizontal thrust.

8. A cableway tower having transportation trucks adapted to run on rails and carry the vertical weight of the tower and the vertical component of the cableway load thereon, and horizontally disposed wheels near the rear side of said tower adapted to engage a thrust rail located in substantially the same plane as the first mentioned rails and resist the horizontal component of the cableway load on the tower that acts laterally of the transportation truck rails, there being means associated with the tower, the transportation trucks, and the horizontal thrust wheels adapted to maintain equalized loading on the wheels to compensate for irregularities in the track rails and swaying of the tower.

9. A cableway tower running gear comprising a platform, trucks under said platform, swivel bearings between the platform and trucks, wheels on said trucks adapted to operate on track rails and to carry the load of the tower and the vertical component of the load on the cableway, horizontally disposed trucks carried by said platform and having substantially horizontally disposed wheels thereon adapted to operate on a monorail disposed at substantially right angles to the track rails and designed to take the horizontal component of the cableway load imposed on the tower and acting laterally of the track rails.

10. A cableway tower having trucks for carrying the vertical component of a cableway load, and thrust wheels adapted to engage a thrust rail and resist the horizontal thrust imposed on the tower by a cableway load, the direction of said thrust being essentially normal to the direction of travel of the tower.

11. A cableway tower having a plurality of load supporting wheels, certain of said wheels being arranged to carry the component of cableway loads acting substantially vertically to the axis of rotation thereof and others of said wheels being arranged to resist the thrust component of the cableway load, said thrust component acting normally in a direction crosswise of the line of travel of the cableway tower.

12. A traveling cableway tower having a system of wheels for supporting both the weight of the tower and the vertical component of the load on the cableway, and also the horizontal thrust component of the cableway load which component acts substantially normal to the direction of travel of the tower, said wheels comprising essentially two systems of wheels in which the wheels of one system revolve in vertical planes and the wheels of the other system revolve in planes at an angle to the vertical to resist said thrust component, and equalizing connections between the wheels and tower for equalizing the vertical load and the thrust forces on the wheels of the respective systems.

13. A traveling cableway tower having a system of wheels for supporting both the weight of the tower and the vertical component of the load on the cableway, and also the horizontal thrust component of the cableway load which component acts substantially normal to the direction of travel of the tower, said wheels comprising essentially two systems of wheels in which the wheels of one system revolve in vertical planes and the wheels of the other system revolve in planes at an angle to the vertical to resist said thrust component, and equalizing connections between the thrust resisting wheels and the tower for effecting substantially uniform load distribution on said wheels.

A. J. ACKERMAN.